United States Patent [19]

Lehner et al.

[11] 4,104,682

[45] Aug. 1, 1978

[54] APPARATUS FOR REDUCING THE NUMBER OF UNDETECTED ERRORS READ ALONG THE LENGTH OF A BINARY INFORMATION BEARING MEDIUM

[75] Inventors: Gerald J. Lehner; Eugene F. Banka, both of Livonia, Mich.

[73] Assignee: Burroughs Corporation, Detroit, Mich.

[21] Appl. No.: 774,740

[22] Filed: Mar. 7, 1977

[51] Int. Cl.² .................... G06K 7/08; G06K 7/10; G11B 25/04
[52] U.S. Cl. .................... 360/2; 235/449; 235/462; 250/569; 360/51
[58] Field of Search .......... 235/61.7 R, 61.7 B, 235/61.11 D, 61.11 E, 449, 462; 250/555, 566, 568, 569; 360/2, 51

[56] References Cited

U.S. PATENT DOCUMENTS

| 3,879,693 | 4/1975 | Roscoe et al. | 235/61.11 R |
|---|---|---|---|
| 3,949,313 | 4/1976 | Tamada et al. | 235/61.11 D |
| 3,949,394 | 4/1976 | Kennedy | 235/61.11 D |

*Primary Examiner*—Daryl W. Cook

*Attorney, Agent, or Firm*—David R. Syrowik; Carl Fissell, Jr.; Kevin R. Peterson

[57] ABSTRACT

An apparatus is described for reducing the number of undetected errors serially read along the length of a magnetic stripe containing binary information. The magnetic stripe is adhesively attached to a plastic card. A serial self-clocking data stream is developed from a manual magnetic stripe encoded card reader. The data stream comprises clock and data signals including a start signal, an end signal and a summation signal. A four-stage down counter counts a predetermined number of clock signals which occur in a predetermined portion of the stripe after the occurrence of the summation signal. State machine control circuitry delays the detection of the data signals occurring after the end signal for a predetermined time to prevent the detection of the summation signal. Control circuitry controls the down counter and provides a finish signal after the down counter has counted off the number of clock signals in the predetermined portion of the stripe. A first AND gate provides an error signal upon the occurrence of a data signal after the summation signal. A status latch is provided to indicate which one, the error signal or the finish signal, occurs first.

11 Claims, 3 Drawing Figures

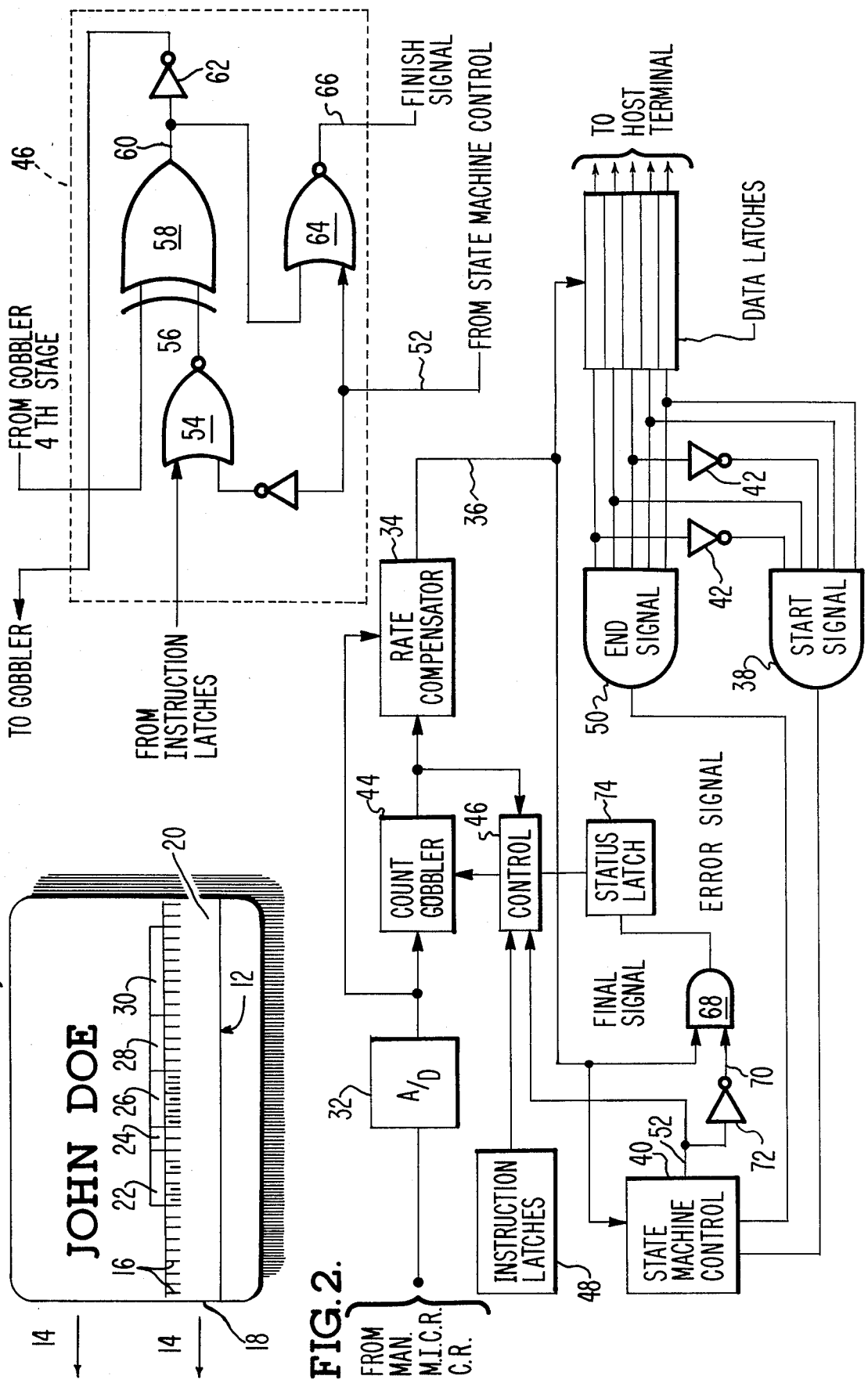

APPARATUS FOR REDUCING THE NUMBER OF UNDETECTED ERRORS READ ALONG THE LENGTH OF A BINARY INFORMATION BEARING MEDIUM

BACKGROUND OF THE INVENTION

This invention relates in general to apparatus and method for detecting data signals contained on a magnetic medium and, in particular, to an apparatus and method for detecting data signals occurring after the end signal on a magnetic medium.

At the present time credit cards are used extensively for a multitude of purposes; for example, for electronic funds transfer. It is envisioned that credit cards will be used to initiate electronic funds transfer to an even greater and greater extent in the future. One way of reading the binary information stored on the magnetic stripe of the credit card is through a manual stripe encoded card reader. The use of such a card reader requires a user to insert the card into the reader and thereafter push or pull the card through the reader to allow the entire magnetic stripe to pass by the read head.

The magnetic stripes which are read are standardized by the American Banking Association. That is, there are a number of standardized signals present on the magnetic stripe. For example, at approximately 0.293 in. from the inserted edge of the credit card a start signal typically appears. The start signal comprises information bits which are disposed between clock pulses which are equidistantly spaced along the magnetic stripe. The magnetic stripe must also include an end signal which signals the end of information bits. An LRC signal occurs immediately after the end signal, which LRC signal is a mod 2 summation of all of the data bits found on the stripe to indicate the entire credit card message.

One problem associated with reading this binary information from the magnetic stripe is that of jitter while the message is being read. Jitter most frequently occurs at the beginning and at the end of the magnetic stripe due to wear and other factors. A prior patent application entitled "A Digital Rate Compensation For A Card Reader", application Ser. No. 672,999 filed on Apr. 2, 1976 by Eugene Banka and Gerald Lehner and assigned to Burroughs Corporation, describes and claims not only a card reader speed compensation system but also apparatus and method for overcoming the jitter problems at the beginning of the magnetic stripe. The present invention describes and claims an apparatus and method for overcoming the jitter problem occurring at the end of a magnetic stripe to thereby reduce the number of undetected errors read from the magnetic stripe.

Jitter not only causes read errors such as parity misreads but even more critical, leads to undetected read errors. An undetected read error can occur if jitter upsets the data recovery logic of the module and the logic thinks that it sees an end signal with the correct parity. The odds of this happening are 1 in 32, assuming a 5 bit binary word with one of the bits being used as a parity bit. For an undetected read error to occur, the LRC signal must also be correct and the odds of this happening are also 1 in 32. Therefore, the odds that an undetected read error can occur are 1 in 1,024.

Since the American Banking Association requires that at least twelve clock bits be provided after the LRC signal on the magnetic stripe, by checking the area between a predetermined number of these clock signals for information in the form of data signals, the odds of undetected read errors occurring are decreased. For example, if eight additional information bit areas are checked, the odds of an undetected read error occurring are 1 out of 262,144 rather than 1 out of 1,024. In other words, these eight bit areas are read to determine whether any information is contained therein to thereby determine whether the end signal and/or the LRC signal were read correctly. For every bit checked after the LRC signal, the odds of an undetected read error occurring go down by a factor of 2.

The present invention provides an apparatus for reducing the number of undetected errors serially read along the length of a binary information bearing medium. The read information comprises a serial self-clocking data stream having clock and data signals including a start signal, an end signal, and a summation signal following the end signal to indicate the number of data signals in the data stream. An apparatus constructed in accordance with the instant invention comprises a first detecting means for detecting the end signal and a second detecting means responsive to the first detecting means for detecting a data signal read from a predetermined portion of the medium read after the summation signal.

Other advantages of the present invention will be readily appreciated as the same becomes better understood by reference to the following detailed description when considered in connection with the accompanying drawings wherein:

FIG. 1 is a typical credit card bearing a magnetic stripe;

FIG. 2 is a block diagram of the subject invention; and

FIG. 3 is a logic diagram of the control block shown in FIG. 2.

A typical credit card to be read is generally shown at 10 in FIG. 1. The credit card 10 includes a magnetic stripe generally indicated at 12 fixedly attached to the credit card 10 in any way well known in the art, such as by an adhesive. The credit card 10 is typically pushed or pulled through a manual magnetic stripe encoded card reader (not shown) in the direction of the arrows 14 until all of the information contained on the magnetic stripe 12 has been serially read therefrom. The information contained on the magnetic stripe 12 comprises a plurality of equidistantly spaced clock pulses 16 extending from the beginning 18 of the magnetic stripe 12 to the end 20 of the magnetic stripe 12. As shown in the U.S. patent application Banka and Lehner, Ser. No. 672,999, the first eight data bit areas are ignored and not read to overcome any potential jitter problem occurring within these data bit areas.

After the first eight data bit areas, the card reader searches for a start signal 22, which start signal 22 indicates to the card reader that what follows are data bits representing the information content of the message contained on the magnetic stripe 12. The information is contained in an information area 24 which is shown in FIG. 1 as a 2 bit area. However, it is to be understood that this area is normally substantially larger than the 5 bit area reserved for the start signal 22. After the data bits in the information area 24 are read, an end signal 26 is read, which indicates the end of the message. An LRC area 28 is provided to contain the LRC signal which is a mod 2 summation of the number of data signals contained on the stripe 12. After the LRC signal, is an area 30 which normally only contains clock bits and not data signals as required by the American Banking Association.

FIG. 2 shows the apparatus in block diagram form for carrying out the subject invention. The above noted patent application, Ser. No. 672,999, is hereby incorporated by reference. The subject patent application shows a signal processing means or an A to D converter 32 for changing the serial self-clocking data stream obtained from the manual magnetic stripe encoded card reader (MICRCR) into discrete or digital signals. A separator means or the rate compensator 34 of the subject application is coupled to the A to D converter 32 for separating the data signals from the clock signals, which data signals are outputted on a lead line 36. The data signals occurring on the lead line 36 are serially stored in a storage means or data latches to be subsequently outputted in parallel fashion to a host terminal. As shown in FIG. 2, the data latches which comprise serially connected flip-flops are five in number to accommodate the standard five-bit binary word of the read information which includes a parity bit. A logic means or a start signal AND gate 38 is electrically coupled along each of its five input lines to corresponding ones of the data latches to sense the start signal after it is stored within the data latches. The AND gate 38 logically indicates the presence of the start signal 22 within the data latches, which AND gate 38 thereafter signals to a delay means or state machine control 40, the occurrence of the start signal. The state machine control 40 prepares or controls the apparatus to read the message contained on the magnetic stripe 12. Inverters 42 are provided on certain input lines of the AND gate 38 because the logical representation of the start signal is "11010".

A timing means or a count gobbler 44 which comprises a four stage down counter is provided for controlling the rate compensator 34 by disabling the rate compensator 34 for the first eight clock periods at the beginning 18 of the stripe 12. Prior to the insertion of the credit card 10 into the card reader, the count gobbler is in its logical "1111" state. It is only after the count gobbler 44 is counted down to its "1110" state that the rate compensator 34 is enabled to thereby output data signals along the lead line 36. The count gobbler 44 is disabled from counting down any further by a control means or control generally indicated at block 46 which controls the down counting of the count gobbler 44. The control 46 is responsive to the state machine control 40 in controlling the count gobbler 44 as will be described in greater detail hereinafter.

Instruction latches 48 are provided so that the user can indicate to the control 46 whether the apparatus is to be in a read or a non-read mode. The instruction latches 48 are manually set to the low or logical "0" state to place the control in its read mode.

After all the information from the information area 24 has been sent to the host terminal via the data latches, an end signal "11111" is serially stored in the data latches via the line 36. The presence of the end signal is sensed by a second logic means or an end signal AND gate 50 which determines the occurrence of the end signal stored within the data latches. The AND gate 50 and the data latches define a first detecting means for detecting the end signal.

The AND gate 50, upon sensing the end signal, indicates this fact to the state machine control 40 whether or not it is the true end signal or merely a misread. The state machine control 40 is responsive to the AND gate 50 for delaying a predetermined time after the end signal is detected in the data latches to allow the accumulation of the summation signal in the data latches. In other words, after the end signal is detected by the AND gate 50, the state machine control 40 contains logic circuitry, allows the summation signal to be stored in the data latches, and as a result, the summation signal is not detected as a data signal.

After the state machine control 40 has allowed the summation signal to be accumulated, the state machine control 40 outputs a low or logical "0" signal along a lead line 52. This low signal causes a NOR gate 54 through an inverter 55 of the control 46 to be disabled to thereby output a low signal along a lead line 56. At this time the fourth stage of the count gobbler 44 is in a low or logical "0" state thereby causing an exclusive OR gate 58 of the control 46 to go to a low state along lead line 60. This low signal which occurs on the lead line 60 is inverted by an inverter 62 and the resulting logical "1" or high state causes the count gobbler 44 to resume counting down from its "1110" state until it reaches its "1111" state again, at which time the signal on the lead line 60 goes to a high state. As a result, the output of a NOR gate 64 of the control 46 outputs a low or logical "0" signal along a lead line 66 in the form of a finish signal. The finish signal is emitted only after the count gobbler 44 has counted down to reassume its "1111" state.

While the count gobbler is counting down from its "1110" state to its "1111" state, a first logic means or error AND gate 68 determines the occurrence of a data signal read after the summation signal by providing an error signal upon such determination. The error AND gate 68 is enabled to provide the error signal if a high or logical "1" signal appears on a lead line 70 concurrent with the occurrence of a data signal on line 36. The low signal appears on the line 52 from the state machine control 40 after the occurrence of a summation signal. The low signal is logically inverted by an inverter 72 so that a high or logical "1" appears on line 70, the input line of the AND gate 68, while the AND gate 68 checks for data signals after the summation signal.

An indicator means or a status latch 74 is provided for indicating the detection of a data signal read from the predetermined portion 30 or, in the preferred embodiment, the eight data bit area from the magnetic stripe 12. The status latch 74 records the first occurrence of either the finish signal or the error signal to thereby indicate whether a data bit did in fact occur within that eight bit area or portion 30 after the summation signal which occurs in the summation area 28.

The status latch 74, the control 46, the count gobbler 44, and the error AND gate 68 comprise a fixing means for fixing the predetermined portion 30 of the magnetic stripe 12 for detecting a data signal read therefrom after the summation signal. The state machine control 40 and the fixing means further defines a second detecting means responsive to the AND gate 50 for detecting a data signal read from the predetermined portion 30 of the magnetic stripe 12 after the summation signal.

Therefore, it can be seen that by checking the stripe 12 for the occurrence of a data bit after the LRC or summation signal, the possibility of an undetected read error is reduced.

The invention has been described in the illustrative manner and it is to be understood that the terminology which has been used is intended to be in the nature of words of description rather than of limitation.

Obviously, many modifications and variations of the present invention are possible in light of the above teachings. It is therefore to be understood that within the scope of the appended claims the invention may be practiced otherwise than as specifically described.

The embodiments of the invention in which an exclusive property or privilege is claimed are defined as follows:

1. An apparatus for reducing the number of undetected errors serially read along the length of a binary information bearing medium, the read information comprising a serial self-clocking data stream having clock and data signals including a start signal, an end signal, and a summation signal following the end signal to indicate the number of data signals in the data stream, said apparatus comprising:

first detecting means for detecting the end signal; and second detecting means responsive to said first detecting means for detecting a data signal read from a predetermined portion of the medium read after the summation signal.

2. The apparatus as defined in claim 1 wherein said second detecting means includes a delay means responsive to said first detecting means for delaying the detection of data signals a predetermined time after the end signal to prevent the detection of the summation signal.

3. The apparatus as defined in claim 2 wherein said second detecting means includes fixing means for fixing said predetermined portion.

4. The apparatus as defined in claim 3 wherein the predetermined portion has a corresponding predetermined number of clock signals and wherein said fixing means includes counter means for counting the predetermined number of clock signals occurring in said predetermined portion.

5. The apparatus as defined in claim 4 wherein said fixing means includes control means responsive to said delay means for controlling said timing means, said control means providing a finish signal after the counting means has counted the clock signals in the predetermined portion.

6. The apparatus as defined in claim 5 wherein said apparatus further includes separator means for separating the data signals from the clock signals and wherein said second detecting means includes first logic means responsive to said delay means for determining the occurrence of a data signal read after the summation signal, said first logic means providing an error signal upon such determination.

7. The apparatus as defined in claim 6 wherein said fixing means includes indicator means responsive to the first occurrence of one of said error signal and said finish signal for indicating the detection of a data signal read from the predetermined portion.

8. The apparatus as defined in claim 7 wherein said apparatus further includes signal processing means for changing said data stream into discrete signals, said separator means being responsive to the discrete signals to separate the data signals from the discrete signals.

9. The apparatus as defined in claim 8 wherein said first detecting means is responsive to said separator means and wherein said first detecting means icludes storage means for storing a predetermined number of said data signals at one time.

10. The apparatus as defined in claim 9 wherein said first detecting means includes second logic means for determining the occurrence of the end signal stored within said storage means.

11. A method for reducing the number of undetected errors serially read along the length of a binary information bearing medium, the read information comprising a serial self-clocking data stream having clock and data signals including a start signal, an end signal and a summation signal following the end signal to indicate the number of data signals in the data stream, said method including the step of detecting the end signal, and detecting a data signal read from a predetermined portion of the medium a predetermined time after the end signal wherein the detection of the summation signal is prevented.

* * * * *